Dec. 31, 1929.   N. WARSHAW   1,741,215
AUTOMATIC BRAKE CONTROLLING MECHANISM
Filed Dec. 24, 1927   2 Sheets-Sheet 1
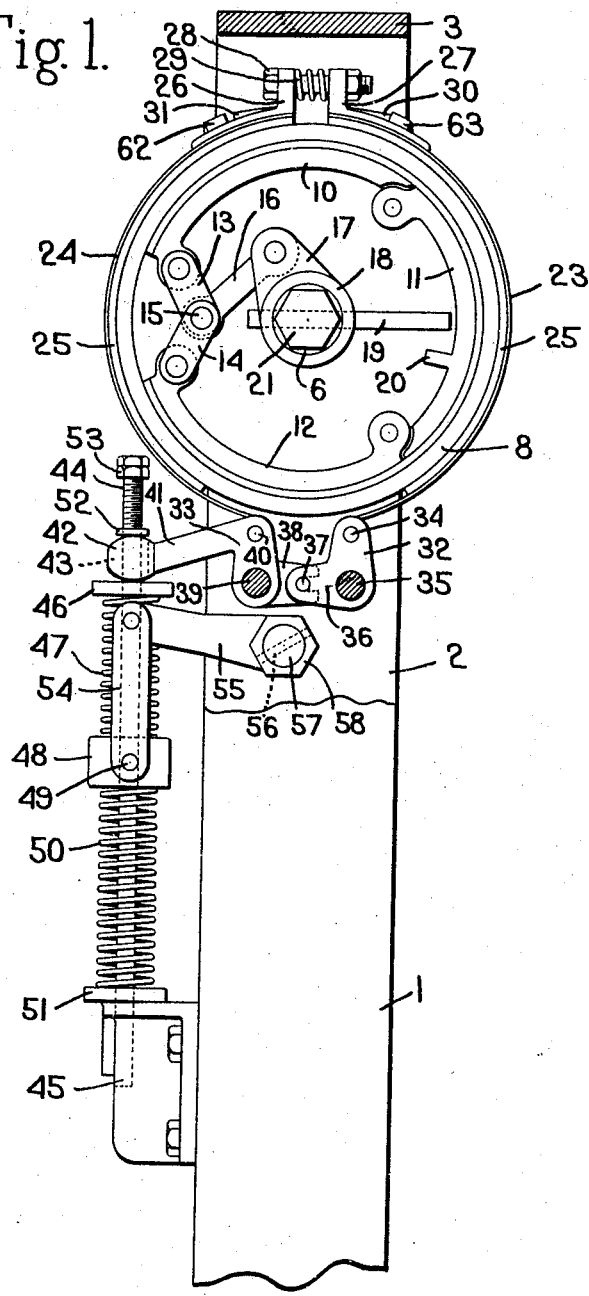
Inventor.
Nathaniel Warshaw
by Heard Smith & Tennant.
Attys.

Dec. 31, 1929.  N. WARSHAW  1,741,215
AUTOMATIC BRAKE CONTROLLING MECHANISM
Filed Dec. 24, 1927   2 Sheets-Sheet 2
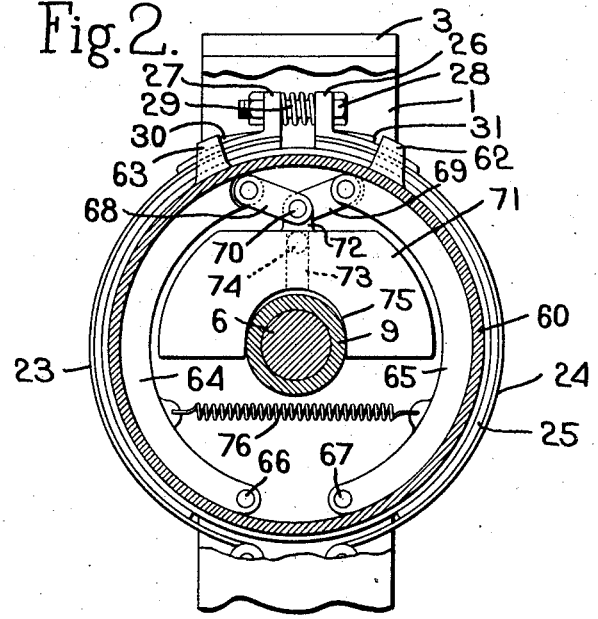
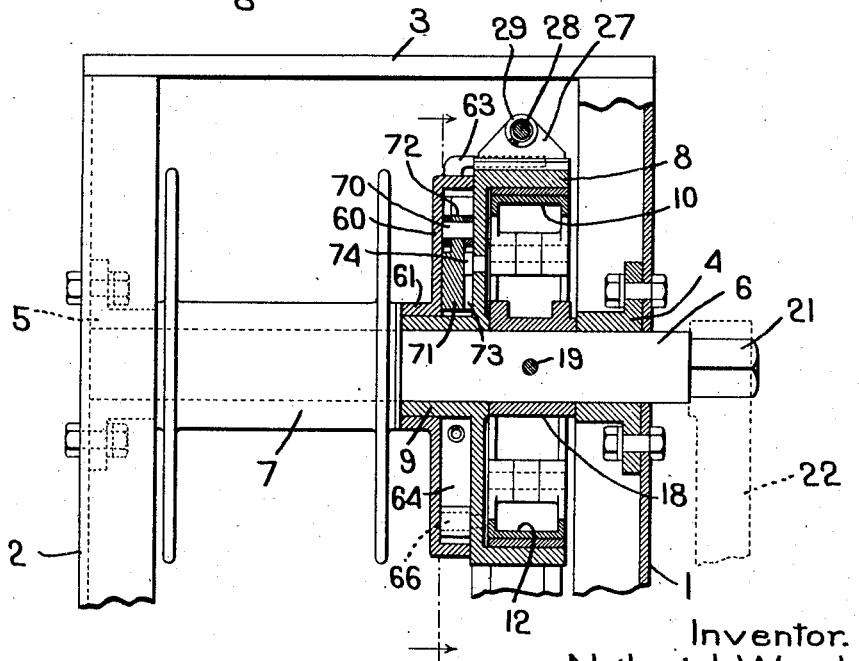
Inventor.
Nathaniel Warshaw
by Heard Smith & Tennant.
Attys.

Patented Dec. 31, 1929

1,741,215

UNITED STATES PATENT OFFICE

NATHANIEL WARSHAW, OF MATTAPAN, MASSACHUSETTS, ASSIGNOR TO LEWIS-SHEPARD COMPANY, OF WATERTOWN, MASSACHUSETTS, A CORPORATION OF MASSACHUSETTS

AUTOMATIC BRAKE-CONTROLLING MECHANISM

Application filed December 24, 1927. Serial No. 242,347.

This invention relates to improvements in automatic brake controls and the general object thereof is to provide an automatically operable brake control for a rotatable device comprising braking mechanism and having centrifugally actuated means operable to prevent acceleration of the rotation of said device beyond a predetermined, substantially uniform, speed of rotation.

A further object of the invention is to provide a rotatable device having a main brake and brake-releasing mechanism with a governor having centrifugally actuated supplementary braking mechanism operable in conjunction with the brake to prevent acceleration of the device beyond a predetermined, substantially uniform, speed of rotation.

A further object of the invention is to provide means for so transmitting the braking force of the supplementary braking mechanism to the main brake as to cause a conjoint braking action of both brakes to prevent acceleration beyond a predetermined, substantially uniform, speed of rotation.

More specifically the invention relates to improvements in hoisting machines having lifting means, an actuating shaft therefor, braking mechanism operable to permit rotation of the shaft in a direction to raise the load, but to prevent rotation thereof in a reverse direction, with means for releasing the braking means to permit descent of the load, and comprises centrifugally actuated means operable in conjunction with the braking mechanism, when the brake is released, to prevent acceleration of the descending movement of the load in excess of a predetermined, substantially uniform, speed, so that the operator will be unable so to release the brake as to drop the load at an undesirable speed.

The invention is illustrated herein as applied to the winch of a hoisting machine, but it will be understood that the invention may also be utilized to control other types of hoisting machines, such as elevators, and, in fact, may be employed for governing the speed of rotation of the shaft, or other rotatable device in any mechanism to which the invention is applicable.

A preferred embodiment of the invention is illustrated in the accompanying drawings as applied to the winch of a hoisting machine of the general type disclosed in the prior application of Frederick J. Shepard, Jr., and Nathaniel Warshaw, Serial No. 86,820, filed February 8, 1926 for improvements in winding drum actuating and controlling mechanism, and to which application reference is made particularly with respect to the main braking mechanism.

In the drawings:

Fig. 1 is a view, partially in section, of a winch frame, the mechanism for actuating the winch drum and the braking mechanism for controlling the same;

Fig. 2 is a detail view, partially in vertical transverse section, illustrating the supplemental or governing mechanism and its relation to the main braking mechanism; and, Fig. 3 is a detail view, partially in vertical longitudinal section, of the main and supplemental braking mechanism.

The mechanism illustrated in the accompanying drawings comprises a winch frame having vertical standards 1 and 2 connected at the top by a plate or girder 3 and provided respectively with suitable journals 4 and 5 in which the actuating shaft 6 of the winch, or other lifting mechanism, is mounted. In the particular construction illustrated a winding drum 7 is mounted upon and fixedly secured to the shaft 6. It will, however, be understood that the winch drum may be mounted upon a separate shaft with suitable power multiplying mechanism interposed therebetween as illustrated in the prior application above referred to.

Braking mechanism is provided which is operable to permit rotation of the shaft in a clockwise direction to raise the load, but normally to prevent rotation thereof in a reverse direction, with manually operable means for releasing the brake to permit the descent of the load. In the particular construction illustrated a brake drum 8 having a laterally extending cylindrical hub 9 is rotatably mounted upon the shaft 6. Pivotally connected brake shoes 10, 11, and 12, co-operate with the inner face of the brake drum 8. The adjacent ends of the brake shoes 10 and 12 are connected by a toggle comprising a link 13 which is connected to the brake shoe 10 and a link 14 which is connected to the brake shoe 12, the knee of the toggle links 13 and 14 being connected by a pivot 15 which in turn is connected to one end of a link 16 the opposite end of which is pivotally connected to an arm 17 extending from the hub 18 which is fixedly secured to the shaft 6 by a pin 19. The pin 19 desirably extends through the shaft 6 nearly to the inner face of the brake shoe 11 and is adapted to engage a lug 20 projecting inwardly from the inner face of the brake shoe 11 when the shaft 6 is turned in a clockwise direction and thereby to cause the brake shoes 12 to rotate with the shaft during the winding-up rotation of the shaft 6.

If the shaft 6 is rotated, or is permitted to rotate in a reverse direction, as is the case when the load is permitted to descend, the arm 17 will act through the link 16 to straighten the toggle, thereby causing the links 13 and 14 thereof to force the brake shoes 10, 11, and 12, into engagement with the inner face of the main brake drum 8. Rotation of this drum, however, is normally prevented by releasable brake mechanism which will hereinafter be more fully described.

The shaft 6 is provided with an angular end portion 21 to receive the complementary socket of an actuating handle 22. The main brake drum 8 is engaged by a suitable brake which, as illustrated herein, comprises a pair of metallic brake bands 23 and 24 having suitable brake lining 25 with means normally clamping the bands upon the drum to prevent rotation of the drum. In the particular construction illustrated the brake bands 23 and 24 are provided respectively with upwardly extending brackets 26 and 27 which are spaced apart and connected by a bolt 28. A spiral spring 29, interposed between the brackets 26 and 27, serves to maintain the brackets 26 and 27 normally in their spaced relation. The brackets 26 and 27 are provided with bosses presenting shoulders 30 and 31 respectively which are adapted to be engaged by a member of the supplemental braking mechanism for purposes which will hereinafter more fully appear. The opposite ends of the brake bands 23 and 24 are connected respectively to bell crank levers 32 and 33 having actuating means adapted to cause the said bell crank levers simultaneously to apply both brake shoes 23 and 24.

The brake band 23 is pivotally connected to a stud 34 in the vertical arm of the bell crank lever 32 which is pivotally mounted upon a stud 35. The bell crank lever 32 is provided with a horizontally extending bifurcated arm 36 with a stud 37 extending across the space between the members thereof. This stud is engaged by the slotted end of a horizontal arm 38 of the bell crank lever 33. The bell crank lever 33 is pivotally mounted upon a stud 39 and the brake shoe 24 is pivotally connected to a stud 40 upon the vertical arm thereof. The vertical arm of the bell crank lever is provided with a lateral extension 41 which has a spheroidal head 42 which is engaged by means normally acting to apply the brake bands, but operable to release the bands.

The brake applying and releasing mechanism illustrated herein is substantially identical with that disclosed in the prior application No. 86,820 aforesaid.

The spheroidal head 42 is bifurcated or provided with a vertical slot 43 which receives the upper portion of a vertical guide rod 44 the lower end of which is slidably mounted in a suitable guideway in a bracket 45 which is secured to and extends laterally from the standard 1 of the frame. The lower face of the spheroidal head 42 rests upon a collar 46 which is loosely mounted upon the rod 44 and is engaged by the upper end of a bodily movable helical spring 47 which surrounds the rod 44 and rests at its lower end upon a cross head 48 which is secured to the rod 44 by a pin 49. The cross head 48 is in turn supported by a helical spring 50 which desirably is relatively stiffer than the spring 47 and which is seated upon a collar 51 which rests upon the bracket 45. A washer or collar 52 rests upon the upper surface of the spheroidal head and is adapted to be engaged by a nut 53 mounted upon the screw threaded upper end portion of the rod 44 and secured in such position by a suitable lock nut. A pair of links 54 are pivotally connected to the pin 49 of the cross head and at their upper ends are connected to a lever 55 which is rigidly secured by a pin 56 to a shaft 57 having a non-circular, preferably hexagonal, head 58 adapted to be engaged by the crank 22.

The springs 50 and 47, acting upon the speroidal end 42 of the bell crank lever 41, tend to swing the lever 41 about its pivot 39 and thereby apply the brake band 24 to the drum 8. At the same time the arm 38 of the lever 33 which engages the stud 37 upon the bell crank lever 32 tends to swing the bell crank lever 32 about its axis in a reverse direction to that of the bell crank 33, thereby applying the brake band 23 to the brake drum 8. The brake bands 23 and 24, therefore, normally prevent rotation of the main brake drum 8. During the winding-up or load-lifting movement of the winch drum 7 the shaft 6 is rotated by the crank 22 in a clockwise direction as aforesaid, while the main brake drum 8 is retained against rotation by the mechanism above described. During the rotation of the shaft 6 in the winding-up direction, the arm 17 draws the link 16 inwardly thereby acting through the toggle links 13 and 14 to withdraw the brake shoes 10, 11, and 12, from engagement with the main brake drum 8. When, however, the winding-up rotation of the actuating shaft 6 ceases and a slight reverse movement is imparted to the actuating shaft 6, the arm 17 will force the link 16 outwardly, thereby straightening the toggle and causing a firm engagement of the brake shoes 10, 11, and 12, with the brake drum 8, thus preventing the continued reverse rotation of the actuating shaft and arresting the descent of the load.

When it is desired to permit the load supporting means, either when loaded or unloaded, to descend, the crank 22 is removed from the shaft 6 and applied to the shaft 57. This shaft is then rotated slightly in a counter-clockwise direction thereby causing the lever 55 to depress the links 54 and the cross head 48, thus compressing the lower spring 50 which constitutes a resilient support for the bodily movable lighter spring 47. This compression of the spring 50 permits the spring 47 to expand, thereby decreasing the effective force applied by it to the spheroidal end 42 of the lever 41, thus gradually releasing the brake bands from the drum and permitting counter-clockwise rotation of the actuating shaft 6 and the winch drum 7 so that the load is permitted gradually to descend. If at any time during such reverse rotation of the actuating shaft 6 the operator releases pressure upon the handle 22, the spring 50 immediately expands and thereby again imposes its force upon the bodily movable spring 47, which in turn causes that spring to actuate the lever 42 again to apply the brake and promptly arrest the descent of the load. This mechanism, therefore, enables the operator to control the descent of the load by manipulation of the handle 22 when applied to the shaft 57 of the brake releasing mechanism and if the operator lets go of the handle, during the descent of the load, the mechanism above described immediately acts to arrest such descent.

If, however, the operator exerts too much force upon the lever 22 when it is applied to the brake releasing mechanism a rapid descent of the load will take place. The present invention contemplates the provision of automatic means for preventing the acceleration of the actuating shaft beyond a predetermined, substantially uniform, speed of rotation and thereby preventing the acceleration of the descent of the load in excess of a predetermined, substantially uniform, speed, or in other words, the invention contemplates the provision of mechanism which enables the brake releasing mechanism to be fully released, but which will act in conjunction with the braking mechanism to prevent the acceleration of the descending movement of the load beyond a predetermined, substantially uniform, speed. This is accomplished by providing supplemental braking mechanism having means operable by the centrifugal force produced by the rotation of the actuating shaft and operable in conjunction with, and preferably through, the main braking mechanism to prevent acceleration beyond a predetermined, substantially uniform, speed of movement. This is accomplished in the preferred embodiment of the invention by centrifugally actuated brake shoes which are carried by the main brake drum and which when actuated by centrifugal force co-operate with a brake drum which in turn engages and acts through one of the brake bands of the main brake.

In the construction illustrated the supplemental braking mechanism or governor comprises a supplemental brake drum 60 having a cylindrical hub 61 which is rotatably mounted upon the hub 9 of the main brake drum. The supplemental drum 60 is provided with a pair of arms 62 and 63 positioned to loosely engage respectively the shoulders 30 and 31 upon the brake straps 23 and 24. Brake shoes 64 and 65, located within and in co-operative relation to the interior face of the supplemental brake drum 60, are pivotally connected at their adjacent ends respectively to studs 66 and 67 which are anchored in the circular web of the main brake drum 8. The opposite ends of the brake shoes 64 and 65 are pivotally connected respectively to toggle links 68 and 69 which extend inwardly and are pivotally connected together by a stud 70 to form the knee of a toggle. A weight 71, located within the supplemental drum, has an extension 72 which is pivotally connected to the stud 70 of the knee of the toggle. Desirably the weight is provided with a guiding groove 73 which extends radially with respect to the axis of the actuating shaft 6 and the web of the main brake drum is provided with a guiding stud 74 which slidably engages the guideway 73 of the weight.

The weight 71 preferably has curved edges substantially concentric with the inner periphery of the drum and spaced apart a sufficient distance from the brake shoes 64 and 65 to permit free movement of the brake shoes. The central portion of the weight also is provided with an arcuate recess 75 which embraces the hub 9 of the main brake drum so that the latter also serves as a radial guide for the weight.

When in the operation of the device the operator places the handle 42 upon the shaft 46 and rotates the same in a direction to release engagement of the brake shoes 23 and 24 of the main brake drum, the weight of the load will cause rotation of the actuating shaft 6 in a reverse direction, thereby rotating the main brake drum in said reverse direction. As the supplemental brake shoes 64 and 65 are connected to the main brake drum the reverse rotation of the main brake drum 8 will cause the brake shoes 64 and 65 to be thrown outward by centrifugal force into engagement with the inner surface of the supplemental brake drums 60. This reverse rotation of the main brake drum will also throw the weight 71 radially outwardly by centrifugal force, thereby exerting its momentum against the knee of the toggle and causing the links thereof to force the supplemental brake shoes 64 and 65 more firmly into engagement with the inner surface of the brake drum 60. The centrifugal force with which the supplemental brake shoes is applied to the supplemental brake drum will, of course, increase in proportion to the speed of rotation of the main drum. The engagement of the brake shoes 64 and 65 with the supplemental brake drum tends to impart rotative movement to the brake drum and the rotative force hereby applied to the supplemental brake drum 60 is transmitted through the arm 63 to the shoulder 30 upon the brake band 23, thereby applying the brake band 23 to the main brake drum 8 with a force proportional to that transmitted from the supplemental brake drum.

The braking movement of the brake shoe 23 is permitted by reason of the yieldable spring 29 which normally maintains the brackets 26 and 27 which are connected to the upper ends of the brake shoes 23 and 24 in separated position. The main and supplemental braking mechanisms are thus so constructed that the conjoint action of the main and supplemental brakes will prevent acceleration of the reverse rotation of the actuating shaft beyond a predetermined speed of rotation and consequently will prevent the descent of the load at greater than a predetermined, substantially uniform, speed.

Desirably the brake shoes 64 and 65 are connected by a tension spring 76 which will prevent effective engagement of the brake shoes 64 and 65 of the supplemental brake drum 60 until the main brake drum has attained a speed of rotation approximating the predetermined desired speed.

By reason of this construction, therefore, the operator may actuate the brake releasing mechanism to permit rapid descent of the load and rely upon the conjoint action of the supplemental and main braking mechanisms to maintain such descent at substantially the predetermined uniform speed. When the load has nearly reached the desired limit of its descent the operator by releasing pressure upon the lever 22 will permit the automatic application of the main brake and stoppage of the descending load.

By reason of the present invention, therefore, as embodied in the mechanism heretofore described, a hoisting mechanism is provided which may be manipulated by an unskilled operator without danger of accident and which will operate at the maximum speed and efficiency for which the mechanism is designed.

It will be understood that the embodiment of the invention particularly disclosed herein is of an illustrative character and that various changes may be made in form, construction and arrangement of parts; that other types of braking mechanism may be employed, and that the invention may be applied to rotating devices other than hoisting machine constructions, since the mechanisms are adapted to be applied to any form of rotating shaft or device having braking mechanism with which the supplemental braking mechanism herein set forth may be associated.

Having thus described the invention, what is claimed as new, and desired to be secured by Letters Patent, is:

1. An automatically operable brake control for a rotatable device comprising braking mechanism including centrifugally actuated means carried by and rotatable with said device and means operable thereby to prevent acceleration of said device beyond a predetermined, substantially uniform, speed of rotation.

2. An automatically operable brake control for a rotatable device having a main brake and brake-releasing means comprising a governor having centrifugally actuated supplementary braking mechanism having means rotatable co-axially with said rotatable device operable in conjunction with said main brake to prevent acceleration of said device beyond a predetermined, substantially uniform, speed of rotation.

3. An automatically operable brake control for a rotatable device having a main brake and brake-releasing means comprising a governor having centrifugally actuated supplementary braking mechanism having means rotatable co-axially with said rotatable device and means for so transmitting the braking force of said supplementary braking means to said main brake as to cause the conjoint braking action of said supplementary braking means and said main brake to prevent acceleration of said device beyond a predetermined, substantially uniform, speed of rotation.

4. An automatic brake control for a rotatable device having a main brake drum, a co-operating brake and brake-releasing means, a governor having a supplementary rotatable brake drum engaging said main brake and co-operating brake shoes carried by said main brake drum centrifugally actuated by the rotation thereof and operable to cause said supplementary brake drum in conjunction with said main brake to prevent acceleration of said device beyond a predetermined, substantially uniform, speed of rotation.

5. An automatic brake control for a rotatable device having a main brake drum, a co-operating brake and brake-releasing means, a governor having a rotatable brake drum engaging said brake, co-operating brake shoes carried by said main brake drum centrifugally actuated by the rotation thereof and operable in conjunction with said main brake to prevent acceleration of said device beyond a predetermined, substantially uniform, speed of rotation, and means for preventing effective actuation of said brake shoes until the speed of rotation of said main brake drum approximates said predetermined speed of rotation.

6. An automatic brake control for a rotatable device having a main brake drum, a co-operating stationary brake and manually operable brake-releasing means, brake shoes pivotally mounted upon said brake drum and centrifugally actuated by the rotation thereof, a supplementary brake drum enclosing said brake shoes, a toggle connecting the opposite ends of said brake shoes and a weight engaging the knee of said toggle operable by centrifugal force produced by the rotation of said device to apply said brake shoes to said supplementary drum, and means connecting said supplementary brake drum to said main brake operable to cause the conjoint action of said main and supplementary brake to prevent acceleration of said device beyond a predetermined speed of rotation.

7. A hoisting machine comprising lifting means, an actuating shaft therefor, braking mechanism operable to permit rotation of said shaft in a direction to raise the load, but to prevent rotation thereof in a reverse direction, means for releasing said main braking means to permit descent of the load, and means including said braking means for controlling the rotation of said shaft in said reverse direction automatically operable by centrifugal force produced by said reverse rotation to prevent acceleration of the descending movement of the load in excess of a predetermined, substantially uniform, speed.

8. A hoisting machine comprising lifting means, an actuating shaft therefor, braking mechanism operable to permit rotation of said shaft in a direction to raise the load, but to prevent rotation thereof in a reverse direction, means for releasing said main braking means to permit descent of the load, supplementary braking means comprising a brake drum, brake shoes rotatable with said shaft co-operating therewith automatically operable by centrifugal force produced by the reverse rotation of said shaft to apply said brake shoes to said supplementary brake drum and means for causing the conjoint braking action of said main brake and supplementary braking means to prevent acceleration of the descending movement of the load beyond a predetermined, substantially uniform, speed.

9. A hoisting machine comprising lifting means, an actuating shaft therefor, a main brake drum rotatably mounted on said shaft, a stationary brake engaging said drum normally acting to prevent rotation thereof, a clutch on said shaft co-operating with said drum having means operable by said shaft when rotated in a direction to lift the load to release said clutch from engagement with said drum and operable upon rotation of said shaft in the reverse direction to cause engagement therewith, manually operable means for releasing said stationary brake from said drum to permit descent of the load, a supplementary brake drum mounted on said shaft having means engaging said brake, co-operating brake shoes mounted on said main brake drum, and means operable by centrifugal force produced by the rotation of said main brake drum to cause said shoes to engage said supplementary brake drum, and means for causing the conjoint braking action of said supplementary and main brakes to prevent acceleration of the descending movement of the load in excess of a predetermined, substantially uniform, speed of rotation.

10. A hoisting machine comprising lifting means, an actuating shaft therefor, a main brake drum rotatably mounted on said shaft, a stationary brake engaging said drum normally acting to prevent rotation thereof, a clutch on said shaft co-operating with said drum having means operable by said shaft when rotated in a direction to lift the load to release said clutch from engagement with said drum and operable upon rotation of said shaft in the reverse direction to cause engagement therewith, manually operable means for releasing said stationary brake from said drum to permit descent of the load, a supplementary brake drum mounted on said shaft, brake shoes pivotally mounted at adjacent ends upon said main brake drum, a toggle connecting the opposite ends of said brake shoes, a weight engaging the knee of said toggle operable by centrifugal force produced by the rotation of said main brake drum to cause engagement of said brake shoes with said supplementary brake drum, and means on said supplementary drum engaging said main brake operable to cause the conjoint action of said supplementary and main braking means to prevent acceleration of the descending movement of the load in excess of a predetermined, substantially uniform, speed.

11. A hoisting machine comprising lifting means, an actuating shaft therefor, a main brake drum rotatably mounted on said shaft, a stationary brake engaging said drum normally acting to prevent rotation thereof, a clutch on said shaft co-operating with said drum having means operable by said shaft when rotated in a direction to lift the load to release said clutch from engagement with said drum and operable upon rotation of said shaft in the reverse direction to cause engagement therewith, manually operable means for releasing said stationary brake from said drum to permit descent of the load, a supplementary brake drum mounted on said shaft, brake shoes pivotally mounted at adjacent ends upon said main brake drum, a toggle connecting the opposite ends of said brake shoes, a weight engaging the knee of said toggle operable by centrifugal force produced by the rotation of said main brake drum to cause engagement of said brake shoes with said supplementary brake drum, means on said supplementary drum engaging said main brake operable to cause the conjoint action of said supplementary and main braking means to prevent acceleration of the descending movement of the load in excess of a predetermined, substantially uniform, speed, and co-operating means upon said main brake drum and said weight to cause said weight to move radially relatively to said shaft.

12. A hoisting machine comprising load lifting means, an actuating shaft therefor, a main brake, resilient means normally acting to apply said brake, manually operable means for releasing said brake against the tension of said resilient means, and supplementary braking means operable in conjunction with said main braking means to prevent acceleration of the descent of the load in excess of a predetermined, substantially uniform, speed.

13. A hoisting machine comprising load lifting means, an actuating shaft therefor, a main brake drum rotatably mounted upon said shaft, a stationary brake, resilient means normally acting to cause said brake to prevent the rotation of said drum, manually operable means for releasing said brake against the action of said spring, supplementary braking mechanism including centrifugally operable brake shoes carried by said main brake drum, a supplementary brake drum, and means for transmitting the braking force produced by the centrifugal action of said supplementary brake shoes upon said supplementary drum to said main brake to cause the conjoint braking action of said supplementary and main brake to prevent acceleration of the descending movement of the load in excess of a predetermined uniform speed.

In testimony whereof, I have signed my name to this specification.

NATHANIEL WARSHAW.